A. O. DADY.
VALVE STRUCTURE.
APPLICATION FILED JAN. 2, 1918.

1,294,418.

Patented Feb. 18, 1919.

Witnesses:
Andrew Winturne
Albin Eklberg

Inventor
Arthur O. Dady
By Williams Bradbury &c
Attys.

UNITED STATES PATENT OFFICE.

ARTHUR O. DADY, OF NEW YORK, N. Y., ASSIGNOR TO PFANSTIEHL COMPANY, INCORPORATED, OF NORTH CHICAGO, ILLINOIS, A CORPORATION OF NEW YORK.

VALVE STRUCTURE.

1,294,418.      Specification of Letters Patent.      Patented Feb. 18, 1919.

Application filed January 2, 1918. Serial No. 209,892.

*To all whom it may concern:*

Be it known that I, ARTHUR O. DADY, a citizen of the United States, residing at New York, in the county of New York and State of New York, have invented a certain new and useful Improvement in Valve Structures, of which the following is a full, clear, concise, and exact description, reference being had to the accompanying drawings, forming a part of this specification.

This invention relates to valves, and is particularly concerned with improvements in hollow exhaust valves of the type in which the head is cooled by means of mercury or other easily volatilized materials confined in the hollow head of the valve. For mechanical reasons as well as for economical reasons it is desirable to reduce the amount of mercury necessary to be employed in these valves to a minimum quantity. This can only be done without impairing the functions of the valve, by providing means for more rapidly conducting the heat away from the portion of the hollow valve stem in which the vaporized mercury is condensed than has heretofore been possible. I accomplish this result by providing a radiator of novel construction, which offers a large radiating surface without materially increasing the weight of the valve. The objects of my invention are therefore to provide a valve having a radiator which is light in weight and at the same time has a very large radiating surface, and which is comparatively cheap to manufacture. Further objects will appear as the description progresses, reference being had to the accompanying drawings, in which—

Figure 1:
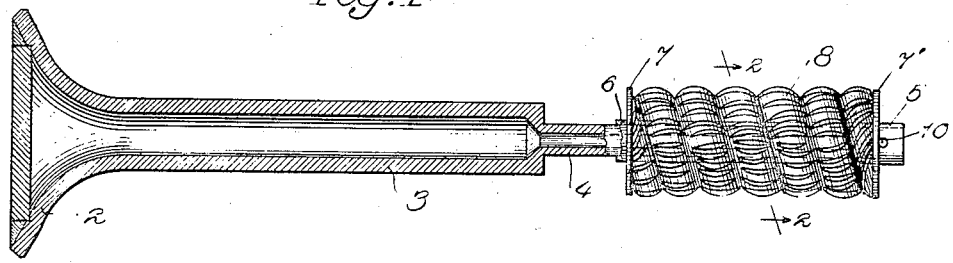
Figure 2:
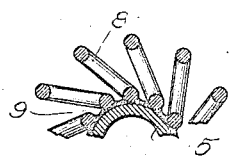

Figure 1 is a view showing a hollow valve partially in longitudinal section, the valve being equipped with my improved radiator, which is shown in elevation; and Fig. 2 is an enlarged sectional detail taken on a line corresponding to the line 2—2 of Fig. 1.

Similar characters of reference refer to similar parts in both views.

Referring to the drawing, Figure 1 discloses a valve comprising a hollow head 2 having a hollow stem 3 that is provided with a reduced portion 4. Slidably mounted upon the reduced portion 4 and snugly fitting thereon is a brass or copper tube 5 having a shoulder 6 at one end, against which the washer or radiating fin 7 abuts. A similar washer 7' is secured to the tube 5 adjacent the opposite end thereof, by brazing, sweating, or any other suitable means. To provide a large number of heat radiating elements or projections at a small expense I wrap a helical spring 8 of brass wire or any other suitable wire about the outer periphery of the tube 5 in the form of a helix, and secure the inner sides of each coil of the helix to the tube 5 by sweating them thereon as indicated at 9 in Fig. 2. I preferably employ brass or copper for this operation, but my invention is not limited to the use of these materials. A pin 10 extends through the end of the tube 5 and the the closed end of the valve stem to prevent the radiator from being jarred from the stem when in operation.

While I have illustrated and described the preferred embodiment of my invention, it is to be understood that my invention is not limited to the details of the structure described, but includes all structures within the scope of the following claims.

Having thus described my invention, what I claim as new and desire to secure by Letters Patent of the United States is:

1. A valve comprising a hollow stem and a radiator therefor comprising a sleeve surrounding said stem and contacting therewith, and a coil spring wrapped about said tube and sweated thereto.

2. A valve comprising a hollow stem and a radiator therefor comprising a sleeve surrounding said stem and contacting therewith, and a coil spring wrapped about said tube and secured thereto.

3. A valve comprising a stem and a radiator therefor, comprising a tube surrounding said stem, and a plurality of wire loops having one side secured to said tube and extending outwardly therefrom.

4. A valve comprising a stem and a radiator therefor, comprising a tube surrounding said stem and a plurality of radiating elements formed from a single piece of wire and secured to said tube.

In witness whereof, I hereunto subscribe my name this 21st day of December, 1917.

ARTHUR O. DADY.

Witnesses:
J. E. LOWE,
V. A. DADY.